United States Patent [19]

Spratt

[11] Patent Number: 4,504,757

[45] Date of Patent: Mar. 12, 1985

[54] CONTACT-CHARGE MOTOR AND GENERATOR

[75] Inventor: James P. Spratt, Rancho Palos Verdes, Calif.

[73] Assignee: Science Applications, Inc., La Jolla, Calif.

[21] Appl. No.: 409,100

[22] Filed: Aug. 18, 1982

[51] Int. Cl.³ .............................................. H02N 1/00
[52] U.S. Cl. ..................... 310/308; 310/309; 310/300
[58] Field of Search ............................... 310/307–309, 310/10, 300, 310

[56] References Cited

U.S. PATENT DOCUMENTS

| | | | |
|---|---|---|---|
| 2,526,642 | 10/1950 | Del Campo | 310/310 |
| 3,414,742 | 12/1968 | Fisher et al. | 310/309 X |
| 3,418,501 | 12/1968 | Felici et al. | 310/309 |
| 3,443,225 | 5/1969 | Moorhead | 310/309 X |
| 3,527,992 | 9/1970 | Bright et al. | 310/309 X |
| 3,614,481 | 10/1971 | Halliday | 310/309 |
| 3,629,624 | 12/1971 | Staudte | 310/309 X |
| 3,696,258 | 10/1972 | Anderson et al. | 310/310 |

Primary Examiner—Donovan F. Duggan
Attorney, Agent, or Firm—Bruno J. Verbeck; Michael L. Slonecker

[57] ABSTRACT

An electro-mechanical device for converting mechanical energy into electrical energy and vice versa, which advantageously utilizes the phenomenon known as contact charging. A metallic first member is urged into intimate abutting contact along a surface thereof with a surface of a second member formed from semiconductor material. The abutting surfaces of the members are each divided into a plurality of segments such that relative movement between the members, while the members are retained in abutting contact, results in the capacitance of the device varying within predetermined limits. Four preferred embodiments of the device are contemplated. In the first embodiment the area of contact between the abutting surfaces is caused to synchronously vary between predetermined limits. In the second, third, and fourth embodiments the contact area remains constant and, instead, the surface characteristics of the second member are controllably varied to thereby cause the variance in capacitance.

9 Claims, 4 Drawing Figures

$V_1 = V_1 \sin(\omega_1 t + \phi)$ where:
$\omega_1 = 2\pi f$
$f$ = line frequency
$\phi$ = phase angle

CONTACT-CHARGE MOTOR AND GENERATOR

BACKGROUND OF THE INVENTION

This invention generally relates to devices for converting mechanical energy into electrical energy, and vice versa. More specifically, it relates to electro-mechanical motors and generators of the contact-charging type.

The term "contact charge" refers to the phenomenon which occurs when material having mobile electrons at some given energy state is brought into intimate contact with another material also having mobile electrons, but at a different energy state. Upon contact of the conductors charge transfer takes place therebetween and a dipole layer is established. This phenomenon is well known; however, little practical use has been made of it because of apparently contradictory demands imposed upon materials by the physical processes involved. For example, those materials providing large charge transfer due to contact charge typically have very high series resistance which detracts from efficient power transfer. Conversely, those materials with low series resistance usually can not support the high internal electric fields associated with large charge transfer. Thus, devices of the type to which this invention pertains have not met with the success presently enjoyed by devices based upon electro-magnetism.

Accordingly, it is the primary object of this invention to provide an electro-mechanical device capable of accomodating large charge transfer and also exhibiting low series resistance whereby the efficient extraction of power is readily achieved.

Another object of this invention is to provide an electro-mechanical device of simple construction, and relatively few moving parts, to thereby obtain a useful article of reduced cost and increased reliability.

A still further object of this invention is the provision of a useful device which can be produced in greatly reduced dimensions.

Another object of this invention is to provide a device which, with only minor modifications, is adaptable for operation as either a motor or generator.

SUMMARY OF THE INVENTION

When a metal is urged into intimate abutting contact with a semiconductor (assumed for purposes of discussion to be of the N-type, although, of course, not necessarily limited to only N-type), thermodynamic equilibrium is established at the interface of the metal and semiconductor by charge transfer, i.e.—electrons are transfered from the semiconductor to the surface portion of the metal in abutment therewith. Such charge transfer establishes a dipole layer between the transferred electrons and the positively ionized donors left behind in the semiconductor. As a result of such contact and the establishment of thermodynamic equilibrium, the conduction and valence bands of the semiconductor are brought into a definite energy relationship with the Fermi level in the metal. Because of this energy relationship, the electrons in the metal (both the electrons normally residing therein and the electrons transferred to the metal surface from the semiconductor) are trapped and prevented from migrating to the semiconductor by a potential energy barrier of height $\phi B$. The dipole layer thus formed, which layer is generally bounded on one side by the surface of the metal to which the electrons from the semiconductor have migrated and on the opposite side to a depth in the semiconductor sufficient to account for the number of electrons which have migrated to the metal surface, is quite stable and the electrical characteristics of the dipole layer region are well known and understood.

The primary characteristics of metal-semiconductor contacts, so-called Schottky diodes, are: (1) the surface charge density on the metal, $Q_M$, and on the semiconductor, $Q_{sc}$; (2) the width of the depletion or dipole layer in the semiconductor, $W$; (3) the capacitance per unit contact area, $C/A$; and (4) the current v. voltage characteristics of the contact, $j(v)$. Equations 1 through 4, which follow, relate the foregoing characteristics to the properties of the constituent materials.

$$Q_M = -Q_{sc} = -qN_D W = -[2K\epsilon_o q N_D(V_{bi}-V)]^{\frac{1}{2}} \qquad \text{Eqn. 1}$$

where $Q_M$ = negative charge per unit contact area on the metal $Q_{sc}$ = positive charge per unit contact area in the body of the semiconductor under the contact $q$ = electronic charge $N_D$ = concentration of ionized donors in the high field region under the contact (ions/cm³)

$W$ = width of the depletion layer in the semiconductor $K$ = relative permittivity of semiconductor $\epsilon_o$ = permittivity of free space $V_{bi}$ = built-in voltage of the dipole layer related to the potential barrier trapping $Q_M$ in the metal $V$ = external voltage difference applied to the junction $$W = \left[ \frac{2K\epsilon_o(V_{bi}-V)}{qN_D} \right]^{\frac{1}{2}} \qquad \text{Eqn. 2}$$

$$(C/A) = \frac{K\epsilon_o}{W} = \left[ \frac{K\epsilon_o q N_D}{2(V_{bi}-V)} \right]^{\frac{1}{2}} \qquad \text{Eqn. 3}$$

$$j = A^*T^2 \left[ \exp\left( -\frac{q\phi B}{kT} \right) \right] \left\{ \exp\left( \frac{qV}{nkT} \right) - 1 \right\} \qquad \text{Eqn. 4}$$

where $j$ = current density carried by contact in amps/cm² at an applied voltage V $A^*$ = modified Richardson constant in amps/cm²/(°K)²

$T$ = absolute temperature in °K $\phi B$ = height of the potential barrier keeping electrons in the metal $k$ = Boltzmann's constant $V$ = externally applied voltage $n$ = diode ideality factor If abutting contact is formed between a first member formed from metallic material and a second member formed from semiconductor material in a manner such that $q_1$ electrons transfer from the semiconductor to the metal, and if the contact is then altered by mechaical means to a new configuration, the surface charge on the metal must either remain constant or increase, depending upon the nature of the change, since the electrons are prevented from leaving by the potential energy barrier $\phi B$. (Thermally generated leakage is neglected at this time.) The charge will increase if the new configuration increases either contact area, semiconductor impurity concentration, semiconductor dielectric constant, the built-in voltage, or some combination thereof. The charge will remain constant if these parameters decrease. For those changes where no additional electrons enter the metal, the charge on the metal under the second set of parameters, $q_2$, will equal the charge under the first set. Equations 5 and 6 show the result of setting $q_1 = q_2$, and assuming $V_1 = 0$.

$$(Q_{sc}A)_1 = (Q_{sc}A)_2 \qquad \text{Eqn. 5}$$

$$A_1[K_1 N_{D1} V_{bi}]^{\frac{1}{2}} = A_2[K_2 N_{D2} V_{bi}(1 - V/V_{bi})]^{\frac{1}{2}} \qquad \text{Eqn. 6}$$

The above equations show that to keep q constant, the reverse junction voltage must rise if one or more of the other junction parameters are forced to decrease. The energy which is contained within the depletion layer capacitance under these high reverse bias conditions has been supplied by the mechanical energy source. From the symmetry of the physical processes involved, voltage applied to the junction between the metal and semiconductor can also induce mechanical motion. It will thus be appreciated that contact-charging effects at metal/semiconductor contacts permit several various electro-mechanical devices to be constructed.

Four preferred forms of motors and generators are contemplated by this invention and in each of those forms only one of the externally controlable variables specified in the foregoing equations is changed. Of course, other forms of this invention are possible where more than one of the controllable variables are changed.

In the first preferred form contemplated for this invention the area of contact between abutting surfaces is caused to synchronously vary within predetermined limits, thus causing the capacitance of the device to also vary within predetermined limits.

In the second preferred form of this invention the area of the semiconductor surface in contact with the metal surface remains constant. Variation in capacitance between predetermined limits is obtained by dividing the semiconductor surface into a plurality of segments, and then doping each segment to a value different from the doping value of the segments adjacent thereto.

In the third preferred form of this invention the surface of the semiconductor is divided into segments substantially identical to the second preferred form. However, in lieu of doping, each segment is formed from a semiconductor material which has a dielectric constant different from the dielectric constant of the semiconductor material used to form the segments adjacent thereto.

In the fourth preferred form of this invention the surface of the semiconductor is divided into segments substantially identical in shape to the second and third preferred forms. However, in lieu of alternating doping or dielectric constants, each segment is formed from a semiconductor material which has a different built-in voltage, with respect to the abutting metal surface, than the semiconductor material used to form the segments adjacent thereto.

As adapted for use as an electrical generator, the foregoing four preferred forms require a power source connected to either the metal or semiconductor for maintaining relative motion therebetween. In the motor version of this invention biasing means are provided to periodically impress a voltage across the metal/semiconductor contact to cause both relative movement between the metal and semiconductor as well as to ensure that the time average value of torque generated by the device is non-zero.

BRIEF DESCRIPTION OF THE DRAWINGS

So that the present invention is more clearly understood, reference is now made to the several accompanying drawings wherein like reference numerals refer to like parts throughout the several views, and wherein.

DETAILED DESCRIPTION OF THE PREFERRED EMBODIMENT

Figure 1:
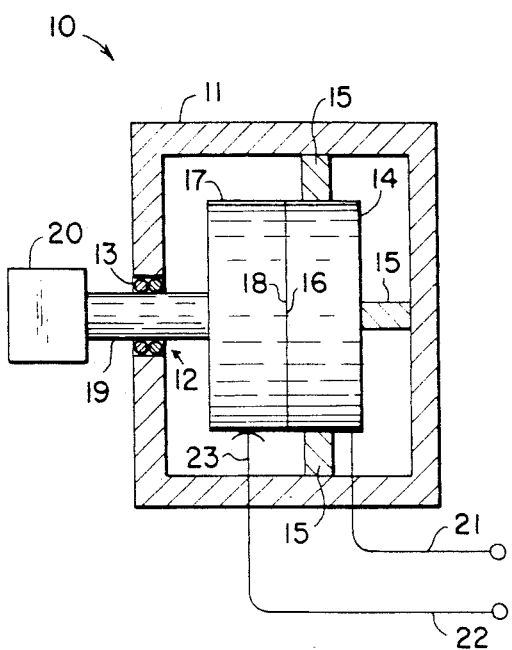
FIG. 1 is a partial side-view, of simplified construction and exaggerated dimensions, of an electrical generator formed in accordance with this invention.
Figure 2:
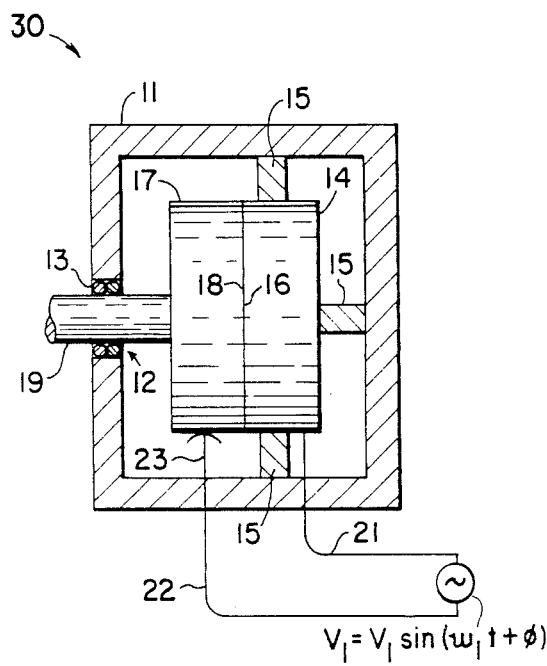
FIG. 2 is a partial side-view, of simplified construction and exaggerated dimensions, of an electrically-powered motor formed in accordance with this invention.

As hereinbefore referred to, the present invention is readily adaptable for use as either an electrical generator or an electrically powered motor. Exemplary forms of a generator and motor constructed in accordance with the practice of this invention are shown in FIGS. 1 and 2, respectively. With reference to FIG. 1, reference numeral 10 denotes an electrical generator comprising a housing 11 having a circular aperture 12 provided through one side thereof and a bearing 13 mounted within said aperture. Disposed within housing 11 is a stator member 14 formed from semiconductor material and retained in fixed stationary alignment within said housing by structural support members 15 or the like. Also disposed within housing 11 is a metallic rotor member 17 having a surface 18 urged and supported in intimate abutting contact with surface 16 of member 14. A rigid shaft 19 is connected at one end thereof to member 17 on the side of said member opposite from surface 18. A power source 20 is connected to the opposite end of shaft 19 whereby rotation of shaft 19 about its longitudinal axis also rotates member 17 about said axis and thus establishes relative movement between members 14 and 17 in a direction substantially along the plane defined by the abutting surfaces 16 and 18. A line 21 is electrically connected to member 14 and a line 22 is electrically connected to member 17, such as by contact brush 23 or the like. Not shown in the figure is an electrical load connected intermediate lines 21 and 22.

With reference to FIG. 2, therein is shown a plan-view of an electrically-powered motor 30 which in all substantial respects is identical to the generator 10 of FIG. 1. The only substantial difference between the figures is that, in lieu of an electrical load, a sinusoidal bias voltage source $V_1$ is electrically connected to lines 21 and 22. A still further difference is that the power source 20 of FIG. 1 has been removed and shaft 19 is thus free for connection to any device which can be powered by virtue of the rotation of shaft 19 about its longitudinal axis.

At this juncture in the discussion it should be borne in mind that the embodiments shown in FIGS. 1 and 2 advantageously exploit the relative rotating movement existing between members 14 and 17. It will be readily appreciated, however, that reciprocating linear motion of member 14 relative to member 17 will also perform with equal facility and is therefore also comprehended by this invention.

FIRST PREFERRED FORM

Figure 3:
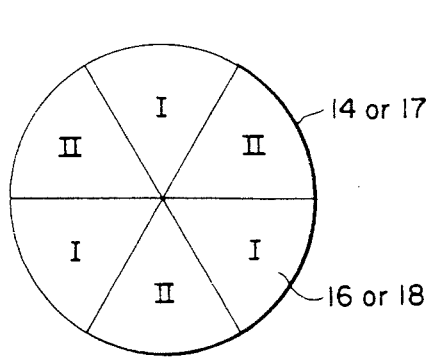
FIG. 3 is a plan view of a surface of a rotor as adapted for practicing this invention. This view also illustrates the surface configuration of the stator utilized in two of the preferred forms of this invention.
Figure 4:
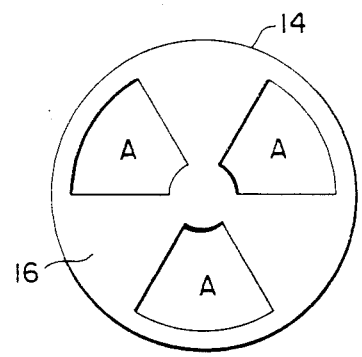
FIG. 4 is a plan view of the stator utilized in the preferred form of this invention wherein the area of contact between the rotor and stator is caused to synchronously vary within predetermined limits.

The first preferred form contemplated for this invention involves varying the contact area between surfaces 16 and 18 within predetermined limits, and is best understood by simultaneous reference to FIGS. 3 and 4. In FIG. 3 is shown a plan view of the surface 18 of a metallic rotor disc corresponding to member 17 in FIGS. 1 and 2. Surface 18 is generally illustrated as being divided into a plurality of alternating wedge-shaped segments. Those segments identified with the reference character I are generally in coplanar alignment and represent the portions of surface 18 which are retained in intimate abutting contact with the surface 16 of member 14, as shown in FIGS. 1 and 2. The remaining segments identified with the reference character II represent portions of surface 18 which have been recessed to a predetermined depth sufficient to break electrical contact with surface 16.

FIG. 4 is a plan view of the surface 16 of a stator disc, formed from semiconductor material, corresponding to member 14 in FIGS. 1 and 2. Surface 16 is substantially planar and has a gross surface area substantially identical to that of surface 18. Surface 16 is shown as also being divided into a plurality of alternating wedge-shaped segments corresponding in number, though not necessarily so, to the number of segments on surface 18. Those portions of surface 16 identified by the reference character A denote portions which have been recessed to a depth sufficient to break electrical contact with surface 18. Recessed portions A each have an angular dimension generally corresponding to the angular dimensions of each of segments I and II (as illustrated, approximately 60°). The radial length of segments A, as measured from the center of surface 16 of member 14, are selected to ensure that segments I of surface 18 are at all times during the operation of the device in contact with the surface 16, but that the area of contact is caused to vary within predetermined limits as said members are rotated relative to each other about an axis normal to surfaces 16 and 18.

Considering a device in which a metallic rotor (17) is caused to rotate relative to a semiconductor stator (14) so that the contact area therebetween varies periodically with time, if the diode thus formed is open circuited (no load across the diode), and if leakage current through the diode is neglected, the charge transferred from the semiconductor to the metal is constant in time and is equal to the surface charge density times the maximum contact area, as represented by equation 7:

$$q = Q_{sc}A = Q_{sc}A_{MAX}$$ Eqn. 7

Since no charge leaves the metal, no replacement current flows and the time rate of change of q is zero, as represented by equation 8.

$$\frac{dq}{dt} = A(t)\frac{\partial Q_{sc}}{\partial v}\frac{dv}{dt} + Q_{sc}\frac{dA}{dt} = 0$$ Eqn. 8

Solving Equation 8 for V as a function of time (assuming all other junction parameters remain constant with time), then for an arbitrary A(t):

$$1 - \frac{V}{V_{bi}} = \left[\frac{A_{MAX}}{A(t)}\right]^2$$ Eqn. 9

If A(t) varies between $A_{MAX}$ and $A_{MIN}$ in such a manner that V varies from 0 to the breakdown voltage of the junction, then the maximum area ratio is defined as follows:

$$\frac{A_{MAX}}{A_{MIN}} = \left[1 - \frac{V_B}{V_{bi}}\right]^{\frac{1}{2}}$$ ; where $V_B$ = diode breakdown voltage  Eqn. 10

SECOND PREFERRED FORM

In the second preferred form of this invention the area of contact between members 14 and 17 remains constant. Instead, variations in the capacitance of the device result from causing the gap, or depletion layer, width of the surface dipole to change over time. It will be noted from Equation 2 above that the depletion layer width is a function of several variables and, thus, the controlled variation of one or more of those variables will achieve the desired result. In this preferred form of the invention the area of contact between members 14 and 17 is caused to vary from a region of high semiconductor impurity concentration ($N_{D1}$) to a region of low impurity concentration ($N_{D2}$), and vice versa, in periodic fashion. This preferred form is best understood by reference to FIG. 3 which illustrates each of surfaces 16 and 18 of members 14 and 17, respectively. The metallic rotor in this form of the invention is substantially identical to the rotor of the first preferred form.

Insofar as member 14 is concerned, it is initially preferably formed from a disc-shaped plate of semiconductor material. The surface 16 of member 14 is divided into a plurality of alternating segments, segments I being coplanarly aligned and segments II representing recessed surface portions. Assuming, only for purposes of discussion, that member 14 is formed from an N-type semiconductor, the recesses defined by segments II are thereafter back-filled, by epitaxial growth or other conventional methods known to the art, with the same semiconductor material forming member 14 to a level coplanar with segments I. The semiconductor material used for back-filling segments II is doped to an impurity concentration level which is higher than the impurity concentration level of the semiconductor material forming member 14. The depth of recessed segments II below the level of segments I is preferably equal to or greater than the depletion layer width existant in segments II during the operation of the device. Of course, member 14 can also be constructed from a plurality of individual segments I and II secured by suitable means to each other to thereby form said member. For example, segments I could be formed from an N-type semiconductor uniform throughout the thickness thereof, and segments II similarly formed from the same N-type semiconductor doped to said higher level.

When the rotor segments I are in contact with the segments II of the stator having a higher impurity concentration, electrons flow from the stator to the rotor to set up the surface dipole layer with the ionized donors left behind in the stator. When the rotor segments I rotate to come into contact with the segments I of the stator having a lower impurity concentration, those electrons previously transferred are trapped on the rotor surface by the Schottky barrier and are thus unable to return to the stator. Because of the reduced donor concentration in the stator at the new point of contact, the depletion layer width must increase to provide a positive charge density sufficient to balance the negative charge density trapped on the rotor surface. This, of course, forces the voltage across the diode to rise.

During the period of time that the rotor remains in contact with the stator segments I of lower impurity concentration, the electrical energy stored in the capacitance of the diode is available to an external load, provided internal diode leakage is negligible. For the "no load" situation, with negligible leakage, the charge on the metallic rotor is constant and is defined by the equation:

$$q = Q_{sc}A = \text{constant} \qquad \text{Eqn. 11}$$

Thus, the time derivative of charge is zero and from such a relationship the time rate of change for the voltage can be determined as set forth below.

$$\frac{dq}{dt} = A\left[\frac{\partial Q_{sc}}{\partial V}\frac{dv}{dt} + \frac{\partial Q_{sc}}{\partial N_D}\frac{dN_D}{dt}\right] = 0 \qquad \text{Eqn. 12}$$

Solving Equation 12 for V at the time when the rotor has just entered into contact with segments I of the stator, then:

$$V = V_{bi}\left[1 - \frac{N_{D1}}{N_{D2}}\right] \qquad \text{Eqn. 13}$$

The upper limit on this voltage is set by the diode breakdown voltage of the more heavily doped segments II of the stator.

THIRD PREFERRED FORM

In this form of the invention the metallic rotor is again substantially identical to the rotor previously discussed with respect to the first and second preferred forms. The semiconductor stator is also substantially identical to the stator discussed with respect to the second preferred form of this invention. However, in lieu of back-filling stator segments II with more heavily doped material, segments II are instead back-filled, by epitaxial growth or other conventional methods known to the art, with a different type of semiconductor having a different dielectric constant. For example, if member 14 is formed from silicon, then segments II would be back-filled with a different type of semiconductor such as, for example, germanium.

When the segments I of the rotor are aligned with the segments II of the stator, metal is in direct contact with the germanium segments producing a capacitance proportional to the square root of the dielectric constant of germanium and inversely proportional to the square root of $(V_{bi}-V)$. K for germanium is 16, while $V_{bi}$ is a function of the metal used. When, as a result of the angular rotation of the rotor, the segments I of the rotor are aligned with the segments I of the stator, metal is in direct contact with silicon and a capacitance is produced proportional to $[K_{si}/(V_{bi}-V)]^{\frac{1}{2}}(K_{si}=12)$. Thus, the capacitance of the device can be caused to change as a result of relative movement between the rotor and stator.

FOURTH PREFERRED FORM

In this form of the invention the metallic rotor is again substantially identical to the rotor previously discussed, and the semiconductor stator is also substantially identical to the stator discussed with respect to the second and third preferred forms of this invention. However, in lieu of back-filling stator segments II with either more heavily doped material or with material having a different dielectric constant, segments II are instead back-filled, by epitaxial growth or other conventional methods known to the art, with a semiconductor which has a different built-in voltage $(V_{bi})$ when in contact with the rotor than does the semiconductor material forming segments I. For example, if member 17 is formed from copper and member 14 is formed from gallium arsenide, then segments II would be back-filled with a different type of semiconductor such as, for example, gallium phosphide.

When the segments I of the rotor are aligned with the segments II of the stator, metal is in direct contact with the semiconductor for which $V_{bi}=V_{bi2}$, and the capacitance of the contact is inversely proportional to the square root of $V_{bi2}$. When, as a result of the angular rotation of the rotor, the segments I of the rotor are aligned with segments I of the stator, metal is in direct contact with the semiconductor for which $V_{bi}=V_{bi2}$. Thus, the capacitace of the device can be caused to change as a result of relative motion between the rotor and stator.

In each of the discussions regarding the preferred forms of this invention, an N-type semiconductor was assumed as the base material from which member 14 was initially fabricated. This assumption was for purposes of discussion only and in no way limits the scope of this invention as semiconductors other than N-type, and other than silicon and germanium, can be used. Similarly, it will also be appreciated that other rotor/stator configurations are readily available and that the metallic member can be used as the stator and the semiconductor as the rotor. Additionally, it should be borne in mind that while the four preferred forms of this invention each utilize relative rotating movement between the rotor and stator, reciprocating linear motion can also be utilized with substantially similar efficacy by modifying members 14 and 17 so that said members are substantially rectangular in shape. In such a form the plurality of alternating segments previously discussed would appear as a plurality of alternating transverse strips.

In each of the foregoing preferred forms of this invention as the rotor moves to a stator segment wherein the controlled variable has a higher value a force is experienced by the rotor which tends to move it into alignment with said higher valued region. Of course, the converse holds true and there is thus a force which acts to oppose movement of the rotor into alignment with the lower valued segments of the stator. In the case of a generator this opposing force is easily overcome by external mechanical means for rotating the rotor. However, in the electrically-powered motor embodiment of this invention such counter-directed forces must be taken into account so as to ensure that a usuable net torque is produced by the device.

By way of example, reference is made to the second preferred form of this invention wherein the stator segments vary between regions of low and high donor impurity concentration levels. When the rotor segments I are in alignment with either of stator segments I or II, the electric field resulting from the surface dipole exerts a force on the rotor which is directed substantially normal to the surface 18. At the edges of rotor segments I, i.e.—those edges generally defined by the radial lines in FIG. 3, the force on the rotor is no longer normal to the surface 16 of the semiconductor, but rather assumes an angle $\theta$ which varies from 90° to 0° as the depletion layer boundary approaches surface 16. However, since the field on each edge is identical, there is no net force on the rotor tending to rotate the same.

As the rotor segments I are caused to move from alignment with stator segments I to stator segments II, the rotor segments I will begin to experience a greater electric field as a result of the larger depeletion layer electric field within the stator segments II. At the surface 18 contact of the rotor with the surface 16 contact of the stator, the electric field at the rotor surface over both stator segments I and II must be normal to the rotor. Thus, neither stator segments I nor II produce net force on the rotor except at the rotor edges. Due to the asymmetry involved, the edge of the rotor disposed upon the stator segment II experiences a greater force than the rotor edge disposed upon the stator segment I. The resultant net force will tend to move the rotor into alignment with stator segments II. The force asymmetry at the edges of the rotor segments I will tend to prevent motion of said segments towards stator segments I.

The net torque on a rotor segment I can be approximated assuming that the component of the surface electric field on the segment at each edge is proportional to the peak field in a one-dimensional Schottky diode depletion layer. Then:

$$T = \int_o^{r_M} F dr = \int_o^{r_M} - q_r E_s r dr \quad \text{Eqn. 14}$$

where
$r_M$ = radius of the active rotor
$F$ = force on the rotor edge
$q_r$ = charge per unit length on rotor edge
$E_s$ = electric field on rotor parallel to the surface at the rotor edge
$T$ = torque on the edge of the rotor in contact with the stator If we assume that $q_r$ is equal to the charge per unit length of a quarter cylinder of charge density $N_D$, radius d (width of depletion layer of a one dimensional Schottky diode), then:

$$q_r \frac{\pi d^2}{4} N_D = \frac{\pi 2 K \epsilon_o (V_{bi} - V)}{4 q} \quad \text{Eqn. 15}$$

The electric field on the rotor parallel to the surface of contact is then given by:

$$E_s = k \left[ \frac{2q(V_{bi} - V)}{K\epsilon_o} \right]^{\frac{1}{2}} N_D^{\frac{1}{2}} \quad \text{Eqn. 16}$$

where k = geometrical factor
Substituting Equations 15 and 16 into Equation 14, and then performing the called for integration, the torque on each edge of the rotor is:

$$T = \quad \text{Eqn. 17}$$

$$\int_o^{r_M} \frac{\pi}{4} \cdot \frac{2K\epsilon_o(V_{bi} - V)}{q} k \left[ \frac{2q(V_{bi} - V)}{K\epsilon_o} \right]^{\frac{1}{2}} N_D^{\frac{1}{2}} r dr$$

$$= \frac{\pi k}{2} \left[ \frac{2(V_{bi} - V)^3 K\epsilon_o}{q} \right]^{\frac{1}{2}} N_D^{\frac{1}{2}} r_M^2$$

At the transition from stator segments I to segments II, $$T = \frac{\pi k}{2} \left[ \frac{K\epsilon_o(V_{bi} - V)^3}{2q} \right]^{\frac{1}{2}} r_M^2 (N_{D2}^{\frac{1}{2}} - N_{D1}^{\frac{1}{2}}) \quad \text{Eqn. 18}$$

Thus, if the rotor generates a torque in passing from segments I to II, a torque will have to be supplied to move the rotor from segments II back to segments I. By providing an external source of electrical power (as shown in FIG. 2) which synchronously keeps the rotor reversed biased when passing from stator segments I to stator segments II, and less heavily biased when passing in the opposite direction, the structure can be made to supply a net torque and is thus a motor.

Based upon the foregoing, it will be understood that a new and unique electromechanical device of the contact charge type is disclosed herein which is adaptable for operation as either an electrical generator or an electrically-powered motor. While several embodiments of the invention have been shown and described, it will be readily apparent that many modifications and changes may be made thereto without departing from the essence and scope of the invention. All such modifications and changes are contemplated as may come within the scope of the appended claims.

What is claimed is:

1. In an electro-mechanical device for converting mechanical energy into electrical energy and vice versa, the combination comprising a first member formed from a metallic material, and a second member formed from a semiconductor material and having a surface in abutting electrical contact with a surface of said first member, said surface of said second member being divided into a plurality of segments such that relative movement between said members in a direction along the plane defined by said abutting surfaces causes the capacitance of said device to vary within predetermined limits.

2. The combination of claim 1 wherein said second member has a recess extending inwardly from the surface thereof in abutment with said surface of said first member.

3. The combination of claim 2 wherein disposed within said recess of said second member to a level coplanar with said surface is a layer of semiconductor material doped to an impurity concentration level which is different from the impurity concentration level of the semiconductor material forming said second member.

4. The combination of claim 2 wherein disposed within said recess of said second member to a level coplanar with said surface is a layer of semiconductor material having a dielectric constant which is different from the dielectric constant of the semiconductor material forming said second member.

5. The combination of claim 2 wherein disposed within said recess of said second member to a level coplanar with said surface is a layer of semiconductor material having a built-in voltage with respect to said first member which is different from the built-in voltage of the semiconductor material forming said second member.

6. The combination of claim 1 further comprising means connected to each of said first and second members for controllably biasing the junction voltage therebetween.

7. The combination of claim 1 wherein each of said segments is formed from semiconductor material doped to an impurity concentration level which is different from the impurity concentration level of the semiconductor material forming the segments adjacent thereto.

8. The combination of claim 1 wherein each of said segments is formed from semiconductor material having a dielectric constant which is different from the dielectric constant of the semiconductor material forming the segments adjacent thereto.

9. The combination of claim 1 wherein each of said segments is formed from semiconductor material having a built-in voltage with respect to said first member which is different from the built-in voltage of the semiconductor material forming the segments adjacent thereto.

* * * * *